(12) United States Patent
Park et al.

(10) Patent No.: US 7,106,900 B2
(45) Date of Patent: Sep. 12, 2006

(54) METHOD FOR GENERATING A BLOCK-BASED IMAGE HISTOGRAM

(75) Inventors: Soo Jun Park, Taejon (KR); Chee Sun Won, Seoul (KR); Dong Kwon Park, Seoul (KR); Dong See Choi, Chungcheongnam-do (KR); Seong Joon Yoo, Taejon (KR); Hyun Jin Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 26 days.

(21) Appl. No.: 10/881,807

(22) Filed: Jun. 30, 2004

(65) Prior Publication Data

US 2004/0240734 A1 Dec. 2, 2004

Related U.S. Application Data

(63) Continuation of application No. 09/493,841, filed on Jan. 28, 2000, now Pat. No. 6,807,298.

(30) Foreign Application Priority Data

Mar. 12, 1999 (KR) .................................. 1999-8383
Oct. 11, 1999 (KR) ............................... 1999-43779

(51) Int. Cl.
*G06K 9/34* (2006.01)
(52) U.S. Cl. ...................................... 382/173; 382/168
(58) Field of Classification Search ........ 382/162–169, 382/199, 254, 268, 274–275, 305, 168–173, 382/232–233, 243; 358/1.9, 515–522, 527, 358/537; 348/671–673, 678–679, 687, 712, 348/713; 345/589–604
See application file for complete search history.

(56) References Cited

U.S. PATENT DOCUMENTS 5,177,602 A * 1/1993 Fujimori ..................... 358/522

(Continued)

FOREIGN PATENT DOCUMENTS

JP 10-301948 * 11/1998

(Continued)

OTHER PUBLICATIONS

Schettini et al., Color Image Classification using Tree Classifier, ITIM, IAMI Consiglio Nazionale delle Richerche, STM-mlCroelectronics, TPA Group, Printer Division, pp. 269-272, Nov. 1999.*

*Primary Examiner*—Ishrat Sherali
(74) *Attorney, Agent, or Firm*—Seed IP Law Group PLLC

(57) ABSTRACT

A method for generating a block-based image histogram from data compressed by JPEG, MPEG-1, and MPEG-2, or uncompressed image data employing block-based linear quantization to generate histograms that include color, brightness, and edge components. The edge histogram, in particular, includes the global edge features, semi-global edge features, and local edge features. The global edge histogram is based on image blocks of the entire image space. The local edge histogram is based on a group of edge blocks. The semi-global edge histogram is based on the horizontally and the vertically grouped image blocks. A method for generating block-based image histogram with color information and brightness information of image data in accordance with an embodiment of the present invention extracts feature information of an image in terms of the block and updates global histogram bins on the basis of the feature information. The method for generating block-based image histogram with color information and brightness information of image data minimizes quantization error by employing linear weight and updates values of histogram bins. The error that occurs at a boundary between bins of the histograms and the linear weight depends on the distance between the histogram bins.

2 Claims, 15 Drawing Sheets

U.S. PATENT DOCUMENTS

| | | | | |
|---|---|---|---|---|
| 5,278,641 A | * | 1/1994 | Sekizawa et al. | 358/527 |
| 5,586,197 A | | 12/1996 | Tsujimura et al. | 382/162 |
| 5,805,733 A | | 9/1998 | Wang et al. | 382/232 |
| 5,845,007 A | * | 12/1998 | Ohashi et al. | 382/199 |
| 5,930,009 A | * | 7/1999 | Sato et al. | 358/518 |
| 5,959,696 A | * | 9/1999 | Hwang | 348/678 |
| 6,072,904 A | | 6/2000 | Desai et al. | 382/225 |
| 6,163,621 A | * | 12/2000 | Paik et al. | 382/169 |
| 6,181,817 B1 | * | 1/2001 | Zabih et al. | 382/170 |
| 6,445,818 B1 | * | 9/2002 | Kim et al. | 382/165 |

OTHER PUBLICATIONS

Swain et al., "Color Indexing", *Internat. J. Computer Vision* 7(1):11-32, 1991.

Jain et al., "Image Retrieval Using Color and Shape", *Pattern Recognition* 29(8): 1233-1243, 1996.

Sethi et al., "Color-WISE: A System For Image Similarity Retrieval Using Color", *SPIE* 3312:140-149, 1998.

* cited by examiner

FIG. 3B
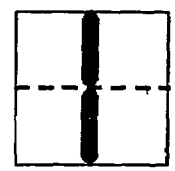
FIG. 3C
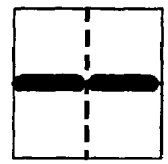
FIG. 3D
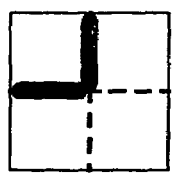 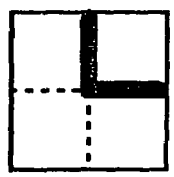 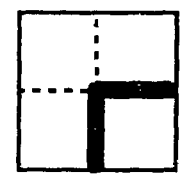 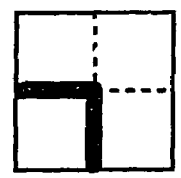
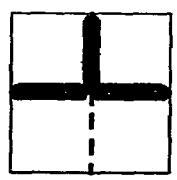 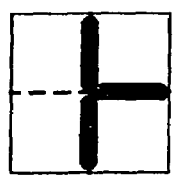 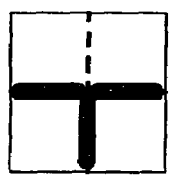 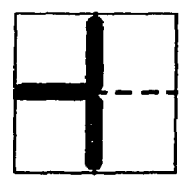 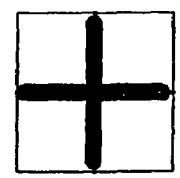
FIG. 4A
| 1 | -1 |
|---|---|
| 1 | -1 |

FIG. 4B

| 1 | 1 |
|---|---|
| -1 | -1 |

FIG. 4C

| $\sqrt{2}$ | 0 |
|---|---|
| 0 | $\sqrt{2}$ |

FIG. 4D

| 0 | $\sqrt{2}$ |
|---|---|
| $\sqrt{2}$ | 0 |

FIG. 4E

| 2 | -2 |
|---|---|
| -2 | 2 |

GLOBAL REGION HISTOGRAM

SEMI-GLOBAL REGION HISTOGRAM

LOCAL REGION HISTOGRAM

METHOD FOR GENERATING A BLOCK-BASED IMAGE HISTOGRAM

RELATED APPLICATION

This patent application is continuation of U.S patent application Ser. No. 09/493,841 filed on Jan. 28, 2000, now U.S. Pat. No. 6,807,298.

TECHNICAL FIELD

The present invention relates to a method for generating a block-based image histogram from data compressed by JPEG, MPEG-1, and MPEG-2, or uncompressed image data. In particular, the method employs block-based linear quantization to generate histograms that include color, brightness, and edge components.

BACKGROUND OF THE INVENTION

JPEG is the international standard for still images and MPEG-1, 2 are for moving pictures. Regarding the compressed image information, feature information is necessary for applications such as extracting key frames, searching images, and browsing.

To extract such feature information, a brightness and color histogram that express relative frequency of brightness and color (red, green, blue) in an image is widely used. Methods comparing histograms have been proposed for searching digital video applications. As histograms are used for searching images and detecting motion change, it is proposed that conventional histograms be improved. That is, conventional single component histograms with discrete quantization and color have been developed, and therefore composite histograms that employ linear update and soft decision are adopted for effective and efficient image description.

U.S. Pat. No. 5,805,733 "Method and system for detecting scenes and summarizing video sequence" disclosed a method that employs color histograms and edge maps for detecting motion change. Though the method is effective in that it extracts color information in consideration of the human eye, it doesn't use brightness information. A method disclosed by a technical paper "Color Indexing" published by International Journal of Computer Vision receives color information and measures similarity of images by histogram intersection method. However, this method doesn't use brightness information and therefore accuracy is not good enough. Also, since the conventional methods generate histograms using a discrete quantization method, a relatively large number of histogram bins are needed to achieve good performance. Consequentially, these methods are not efficient in terms of storage and similarity measurement.

In addition, because the conventional methods perform feature extraction in terms of pixel in generating histograms, feature information is very restrictively generated.

SUMMARY OF THE INVENTION

A method for generating a block-based image histogram is provided.

A method for generating a block-based image histogram using a color information and a brightness information of an image data includes the following steps. The first step is to extract edge information of an image in terms of a block. The second step is to update edge histogram bins on the basis of the edge information to generate a global edge histogram.

Preferably, the step of extracting the edge information further comprises the following steps. The first step is to divide the block into a plurality of sub-blocks by dividing the block by half with respect to horizontal direction and dividing the block by half with respect to vertical direction. The second step is to obtain brightness representative values of the sub-blocks, respectively. The third step is to determine if an edge exists in the block and determining an edge type by comparing a brightness difference between the adjacent sub-blocks with a threshold.

Preferably, the determining step determines that the edge exists and detects the edge type if the brightness difference is larger than the threshold or determines that the block is a monotone block if the brightness difference is not larger than the threshold.

Preferably, the brightness representative value of the sub-block is an average value of the pixels within the sub-block.

Preferably, the brightness representative value of the sub-block is a median value of the pixels within the sub-block.

Preferably, another method of extracting the edge information comprises the following steps. The first step is to divide the block into four sub-blocks by dividing the block by half with respect to a horizontal direction and dividing the block by half with respect to a vertical direction. The second step is to obtain brightness representative values of the sub-blocks, respectively. The third step is to obtain an edge value of 0 degree, an edge value of 45 degree, an edge value of 90 degree, an edge value of 135 degree, and a complex edge value by convoluting the brightness representative values with filter coefficients. The fourth step is to determine if an edge exists in the block and determining an edge type by comparing a maximum edge value with a threshold, wherein the maximum edge value is the largest value among the edge value of 0 degrees, the edge value of 45 degrees, the edge value of 90 degrees, the edge value of 135 degrees, and a complex edge value.

Preferably, the obtaining step of the edge value of 0 degrees, the edge value of 45 degrees, the edge value of 90 degrees, the edge value of 135 degrees, and the complex edge value is calculated by applying the brightness representative values and the filter coefficients to following equations.

$$edge90 = \left|\sum_{i=0}^{3} (\text{mean\_sub\_block}(i) \times \text{edge90\_filter}(i))\right|$$

$$edge0 = \left|\sum_{i=0}^{3} (\text{mean\_sub\_block}(i) \times \text{edge0\_filter}(i))\right|$$

$$edge45 = \left|\sum_{i=0}^{3} (\text{mean\_sub\_block}(i) \times \text{edge45\_filter}(i))\right|$$

$$edge135 = \left|\sum_{i=0}^{3} (\text{mean\_sub\_block}(i) \times \text{edge135\_filter}(i))\right|$$

$$complex\_edge = \left|\sum_{i=0}^{3} (\text{mean\_sub\_block}(i) \times \text{complex\_edge\_filter}(i))\right|$$

wherein the edge90_filter(i), the edge45_filter(i), the edge135_filter(i), and the complex_edge_filter(i) are filter coefficients, and wherein the mean_sub_block(i) is average brightness value of ith sub-block.

Preferably, the method for generating a block-based image histogram in accordance with an embodiment of the present invention further comprises the following step of grouping the blocks and thereby generating a local edge histogram using the edge information extracted from each block in terms of the local regions.

Preferably, the method for generating a block-based image histogram in accordance with an embodiment of the present invention further comprises the following step of grouping the local regions with respect to horizontal direction and vertical direction and thereby generating a semi-global edge histogram using the edge information extracted from each block in terms of the semi-global regions.

Preferably, the global histogram, semi-global histogram, and the local histogram are normalized separately.

Preferably, the method for generating a block-based image histogram in accordance with an embodiment of the present invention further comprises the following steps. The first step is to initialize a variable k and determining a block size of level k by grouping the pixels of the image. The second step is to update related histogram bins by extracting a feature information of the image in terms of a block regarding all blocks of the level k. The Third step is to update related histogram bins by grouping blocks of level k to form a block of level k+1, merge the feature information of the level k, and extract the feature information of the image in terms of a block regarding all blocks of the level k+1.

Preferably, the method for generating a block-based image histogram using color information and brightness information of image data comprises the following steps. The first step is to extract the color information and the brightness information by employing a linear weight depending on a distance between histogram bins. The second step is to update values of the histogram bins to minimize a quantization error occurring at a boundary between the histogram bins. Preferably, the step of extracting the color information and the brightness information further comprise the following steps. The first step is to express a hue and a saturation of the color from the given color space. The second step is to obtain the linear weight between the saturated representative colors and the linear weight between unsaturated color and saturated color using the hue and the saturation of the color. The third step is to determine if the color of the block is a pure color or a dark saturated color usint the saturation. The fourth step is to calculate an increase of color histogram bins with the linear weight and updating related color histograms if color of the block is pure color or calculating an increase of color histogram bins and brightness histogram bins with the linear weight and linear weight and updating related color histograms and related brightness histograms if the color of the block is a dark saturated color.

Preferably, if the color space is YCbCr color space, from the Cb, Cr components, hue and saturation values are obtained by equation 1 and equation 2, respectively.

$$ph = \tan^{-1}\frac{Cb}{Cr}$$ [Equation 1]

$$ps = \sqrt{Cr^2 + Cb^2}$$ [Equation 2]

Preferably, the sum of increases of color histogram bins in terms of a block normalizes to 1.

A method for generating a block-based image histogram using color information and brightness information of image data in accordance with an embodiment of the present invention includes following steps. The first step is to group a plurality of pixels of the image into a block. The second step is to divide the block into four sub-blocks by dividing the block by half with respect to a horizontal direction and dividing the block by half with respect to a vertical direction and then obtaining brightness representative values of the sub-blocks and determining if an edge exists in the block and an edge type by comparing a brightness difference between the adjacent sub-blocks with a threshold. The third step is to increase related edge histogram bins on the basis of the edge type and thereby updating the edge histograms. The fourth step is to obtain a hue and a saturation of the color from a color space of the image and to obtain a linear weight between representative saturated colors and a linear weight between the saturated color and a unsaturated color. The fifth step is to calculate an increase of color histogram bins with the linear weight and updating related color histograms if the color of the block is a pure color or calculating an increase of color histogram bins and brightness histogram bins with the linear weight and the linear weight and updating related color histograms and related brightness histograms if color of the block is a dark unsaturated color.

Preferably, the method describes at least two features of information by one composite histogram in a group of the feature information, wherein the feature information includes the color information and the brightness information of the image.

BRIEF DESCRIPTION OF THE DRAWINGS

The embodiments of the present invention will be explained with reference to the accompanying drawings, in which:

FIGS. 3A–3D show brightness representative values of sub-blocks and edge types, the sub-blocks being included in a block;

FIGS. 4A–4E show block filters for edge detection;

DETAILED DESCRIPTION OF THE INVENTION

Figure 1:
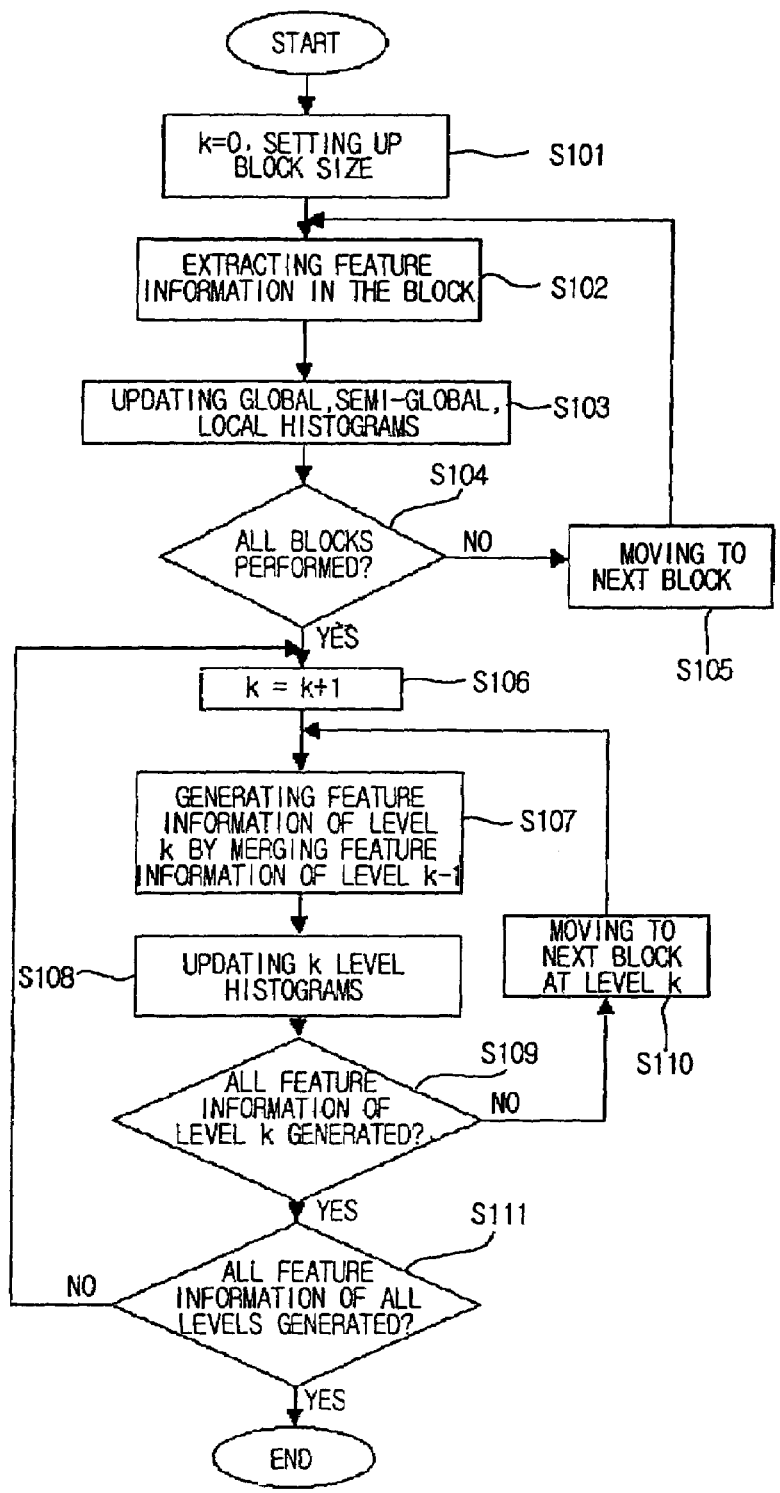
FIG. 1 is a flow diagram illustrating the method for generating block-based image histogram in accordance with an embodiment of the present invention.

FIG. 1 is a flow diagram illustrating the method for generating a block-based image histogram in accordance with an embodiment of the present invention.

As shown in FIG. 1, first of all, variable k is initialized. Then, pixels of the image are grouped into a group, and a size of the basic block at level 0 is set up at step S101. Feature information is extracted from all the basic blocks at level 0 and histograms are updated accordingly. That is, feature information is extracted at step S102 and a histogram is updated at step S103. The update and the extraction are applied to all blocks at step S104 and step S105. At the moment, global histogram, local histogram, and semi-global histogram are generated at level 0. The feature information includes brightness, color, and edge information, and the extraction process is described later.

After feature information regarding all blocks at level 0 is extracted, variable k is increased by 1 at step S106. Feature information of level 1 is generated by merging feature information of level 0 at step S107 and related histograms are updated at step S108 accordingly. A block at level 1 may be generated by grouping blocks of level 0, and feature information of level 1 may be generated by merging feature information of level 0. A process in which feature information is extracted from all blocks of level 0 and related histograms are updated is repeated at step S109 and step S110.

If feature information generation is not completed regarding all blocks of level 0 at step S111, the variable that represents level is increased by one at step s106. Once feature information about all levels is generated, the process is substantially completed.

The upper levels are useful when users want to extract feature information in detail and the global histogram is generated at an upper level.

The method for generating block-based image histogram in accordance with an embodiment of the present invention has the following five features. First, a number of pixels are grouped into a block and the block is used as a basic unit in extracting feature information. Second, the feature information that is extracted in terms of block includes edge and texture information. Third, block size is variable on the basis of image size and feature information of fixed quantity is available regardless of image size. Fourth, linear weights are applied in calculating an increase in order to minimize quantization error. Fifth, regarding an image, separate histograms are generated for global region, semi-global region, and local region. The method in accordance with an embodiment of the present invention is explained with emphasis on the five features.

In conventional methods for generating histograms, brightness feature information or color feature information that are extracted from pixels of an image is updated at only related histogram bins. However, in an embodiment of the present invention, a number of pixels are grouped into a block and the related histogram bins are updated in terms of the block. That is, an update of histogram bins is defined in block unit and therefore not only brightness and color features of an image but also edge feature information that has various resolutions is extracted. In addition, block size may be changed on the basis of image size and therefore feature information of fixed quantity may be extracted regardless of image size.

When the image is a still image compressed by JPEG, 16×16 pixels size of the macro block may be used as a unit block. When the image is compressed by MPEG, four DCT (Discrete Cosine Transform) blocks may be used as a unit block. Likewise, a large unit block size may be used in proportion to a large image size.

Figure 2:
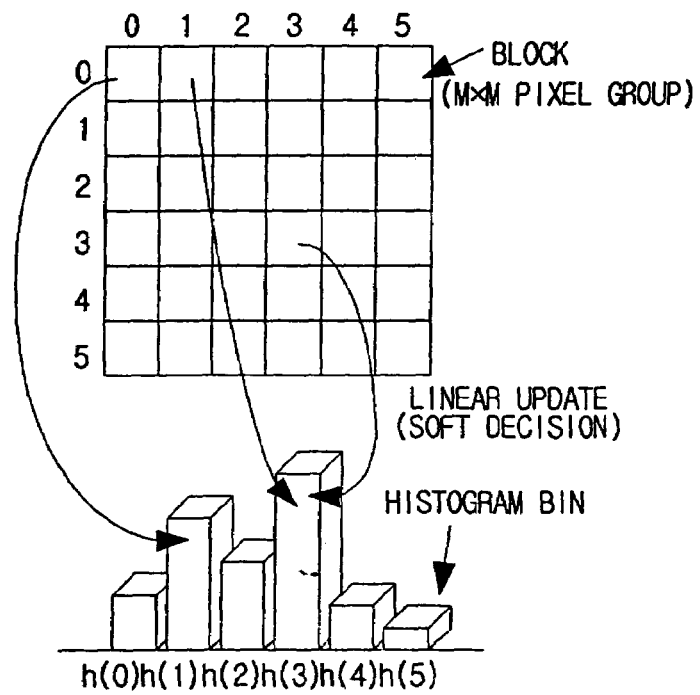
FIG. 2 is a block diagram illustrating the method for updating block-based image histogram bin in accordance with an embodiment of the present invention.

FIG. 2 is a block diagram illustrating the method for updating block-based image histogram bin in accordance with an embodiment of the present invention. Feature information extracted from each block is used to update histogram bins.

Feature information that is extracted from a block is explained.

In the method in accordance with an embodiment of the present invention, pixels are grouped into a block and feature information is extracted from the block. Therefore, not only brightness information and color information, but also other feature information such as edge information generated in the block and texture information may be acquired.

The feature information may be reflected for updating a composite histogram. The composite histogram represents various types of histogram bins by a histogram. As shown in FIGS. 3A–3D, a block includes four sub-blocks. Each sub-block contains a number of pixels and the sub-block is represented by an average value or median value of the number of pixels. Edges of the sub-blocks may be detected in the following manner.

The first embodiment of the method for detecting edges is as follows.

Figure 3A:
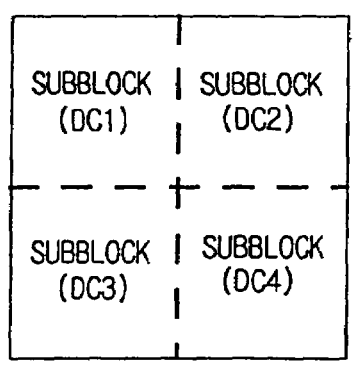

As shown in FIG. 3A, a block includes four sub-blocks. Brightness representative value of each sub-block is named as DC1, DC2, DC3, and DC4. A threshold value, Te, is defined for detecting edges between blocks. If the brightness difference between blocks is larger than Te, an edge exists and the edge is described by a thick sold line. As shown in FIG. 3B, FIG. 3C, and FIG. 3D, the edge may be categorized into one of three kinds. FIG. 3B shows a vertical edge. FIG. 3C shows a horizontal edge. FIG. 3D shows a miscellaneous edge. If an edge is detected, the related histogram bin is increased by one.

The second embodiment of the method for detecting edges is as follows.

Figure 5:
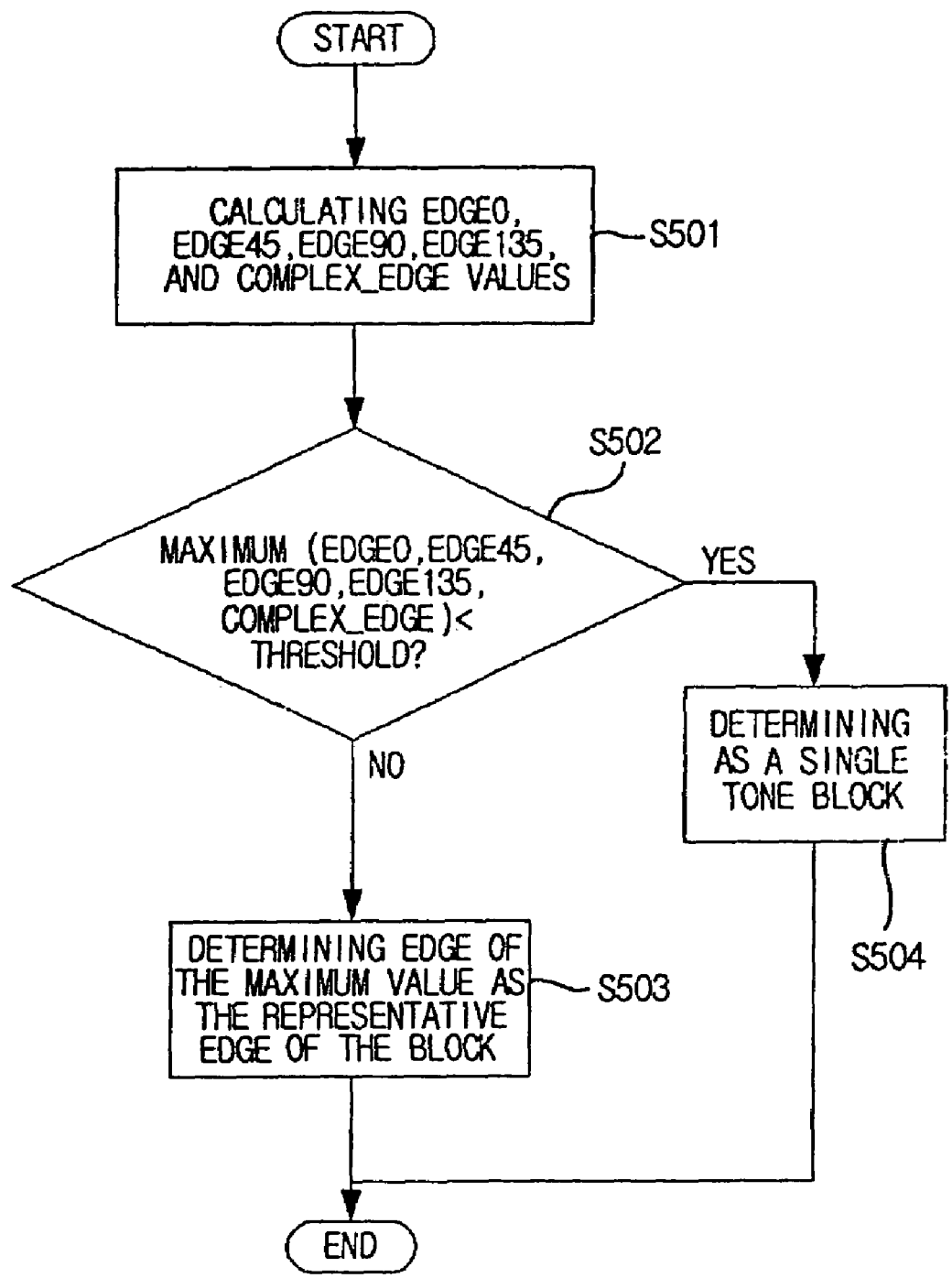
FIG. 5 is a flow diagram illustrating edge detection process.

FIGS. 4A–4E show block filters for edge detection. FIG. 4A shows coefficient values of edge 90. FIG. 4B shows coefficient values of edge 0. FIG. 4C shows coefficient values of edge 45. FIG. 4D shows coefficient values of edge 135. FIG. 4E shows coefficient values of complex_edge. FIG. 5 is a flow diagram illustrating edge detection process.

As shown in FIG. 5, an edge value of 0 degrees (edge0), an edge value of 45 degrees (edge45), an edge value of 90 degrees (edge90), an edge value of 135 degrees (edge135), and a complex edge value (complex_edge) are obtained at step S501. The edge values may be obtained by convoluting five filters shown in FIG. 4 and representative values of sub-blocks. This is described in equation 1.

$$edge90 = \left| \sum_{i=0}^{3} (\text{mean\_sub\_block}(i) \times \text{edge90\_filter}(i)) \right| \quad \text{[Equation 1]}$$

-continued $$edge0 = \left| \sum_{i=0}^{3} (\text{mean\_sub\_block}(i) \times \text{edge0\_filter}(i)) \right|$$

$$edge45 = \left| \sum_{i=0}^{3} (\text{mean\_sub\_block}(i) \times \text{edge45\_filter}(i)) \right|$$

$$edge135 = \left| \sum_{i=0}^{3} (\text{mean\_sub\_block}(i) \times \text{edge135\_filter}(i)) \right|$$

$$\text{complex\_edge} = \left| \sum_{i=0}^{3} (\text{mean\_sub\_block}(i) \times \text{complex\_edge\_filter}(i)) \right|$$

In equation 1, mean_sub_block(0), mean_sub_block(1), mean_sub_block (2), and mean_sub_block(3) represent DC1 of FIG., DC2, DC3, and DC4 respectively. Also, edge90_filter(i), edge45_filter(i), edge135_filter(i), and complex_edge_filter(i) represent filter coefficient values shown in FIG. 4. For example, edge45_filter(0) and edge45_filter(3) are √2 and edge45_filter(1) and edge45_filter(2) are 0.

After the edge value of 0 degrees (edge0), the edge value of 45 degrees (edge45), the edge value of 90 degrees (edge90), the edge value of 135 degrees (edge135), and the complex edge value (complex_edge) are calculated, it is determined if the largest value among those edge values is larger than the threshold (Th_sub_difference) at step S502. Then a monotone block and an edge block are discriminated. That is, if the maximum edge value is larger than the threshold value, the corresponding edge is determined as the representative edge of the block at step S503. However, if the maximum edge value is smaller than the threshold, the block is determined as a monotone block at step S504. After edge types are determined, the value of the related histogram bin is increased by one.

The variable size block of feature information extracted from blocks is explained.

Figure 6:
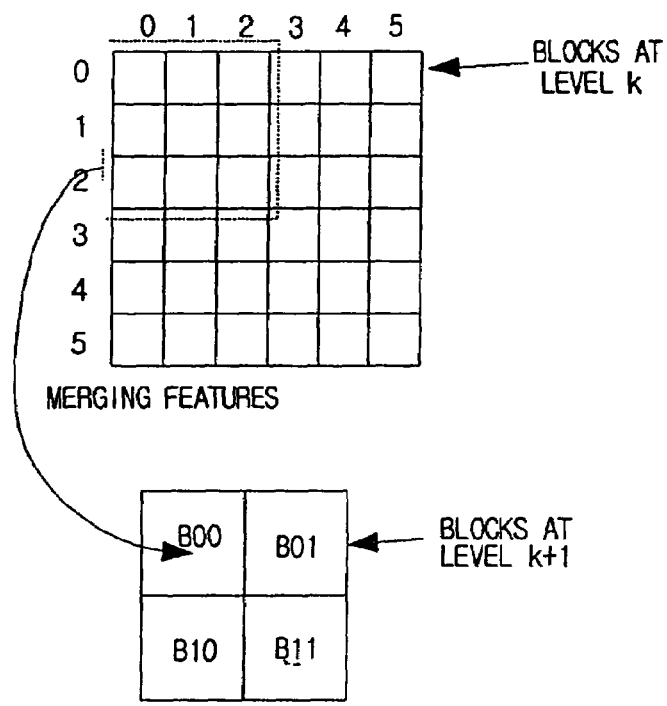
FIG. 6 is a diagram illustrating a process to generate an upper level block by merging a number of lower level blocks.

So far, distribution of brightness, color, and edge of an image has been extracted in a certain resolution. However, feature information needs to be extracted by various resolutions in order to describe the image efficiently. In an embodiment of the present invention, as shown in FIG. 6, upper level (level 1) is defined by grouping a number of basic blocks (level 0). That is, a number of blocks at lower level k define a block at upper level k+1. In FIG. 6, blocks from (0,0) to (5,5) are blocks at level k. Nine blocks of level k are grouped and blocks between (0,0) and (2,2) become B00 block at level k+1. Blocks between (0,3) and (2,5) become B01 block at level k+1. Blocks between (3.0) and (5,2) become B10 block at level k+1. Blocks between (3,3) and (5,5) become B11 block at level k+1.

Figure 7:
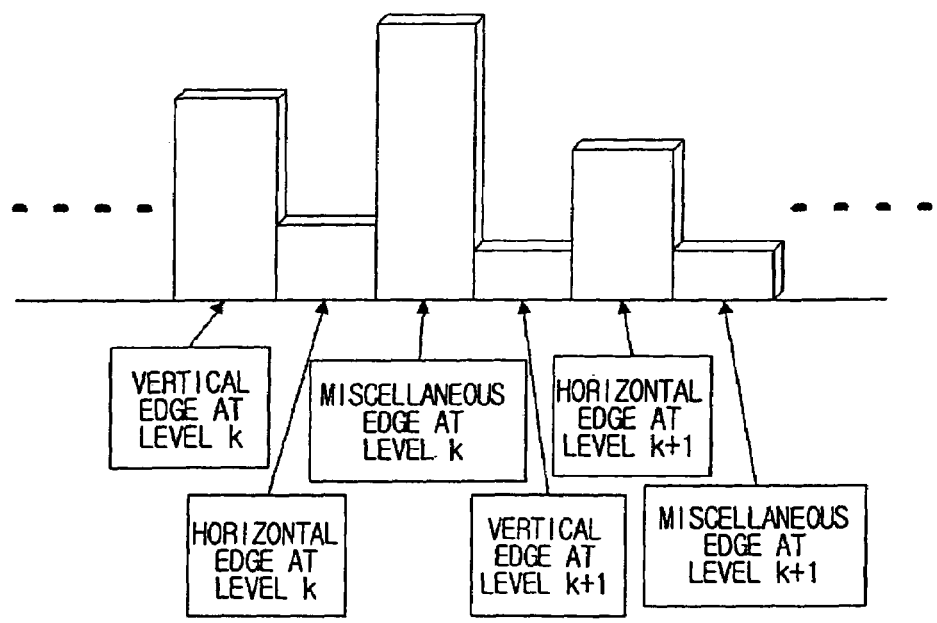
FIG. 7 is a diagram illustrating an embodiment of histogram semantic.

Edge components are extracted from each level and histogram bins are generated to describe images efficiently. Feature information of upper level block may be simply obtained from feature information of upper level blocks. Since feature information of upper level block contains information regarding position information in an image, histograms of the semantic that contains feature information of position and resolution regarding upper level blocks and lower level blocks may be formed as shown in FIG. 7. That is, vertical edge histogram bins, horizontal edge histogram bins, and miscellaneous edge histogram bins may be generated separately.

Linear update is now explained.

As shown in FIGS. 8A–8D, regarding colors, conventional methods for updating histograms employ a binary decision that increases related histogram bins on the basis of existence of data in given region. In these cases, if some data exists at a boundary between bins, similar color features are reflected, yet the features are allocated to the two bins separately. Therefore, they are described as different feature information and it causes a serious error. To cancel out the error, low-pass filters have been employed for smoothing histograms in conventional methods. However, since the smoothing operation causes loss on feature information, precise feature information of the image cannot be reflected.

FIGS. 8A–8D show a conventional method for updating a histogram without considering linear weights.

Figure 8A:
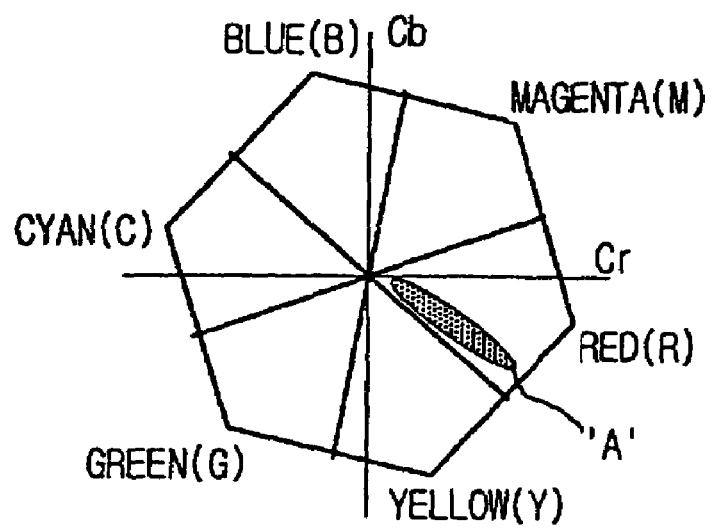
FIGS. 8A–8D show a conventional method for updating histogram without considering linear weights.
Figure 8B:
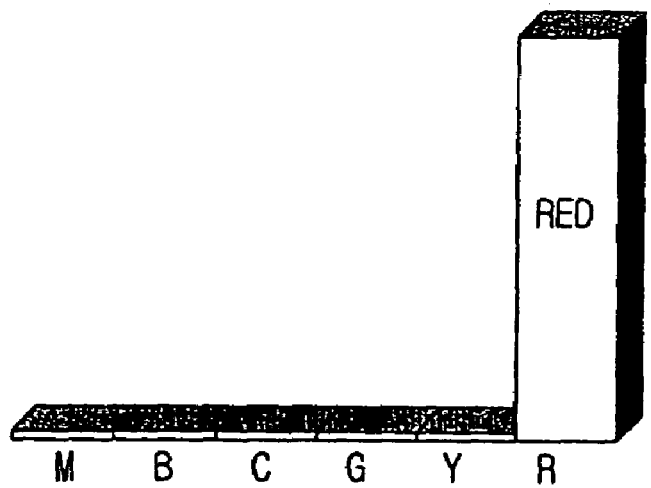
Figure 8C:
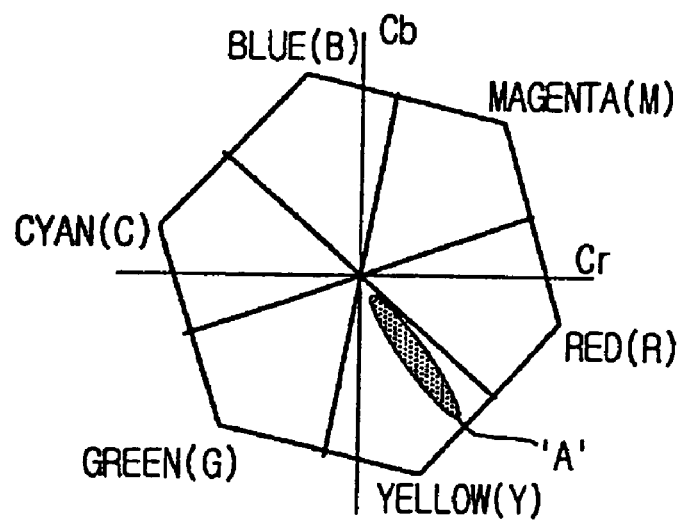
Figure 8D:
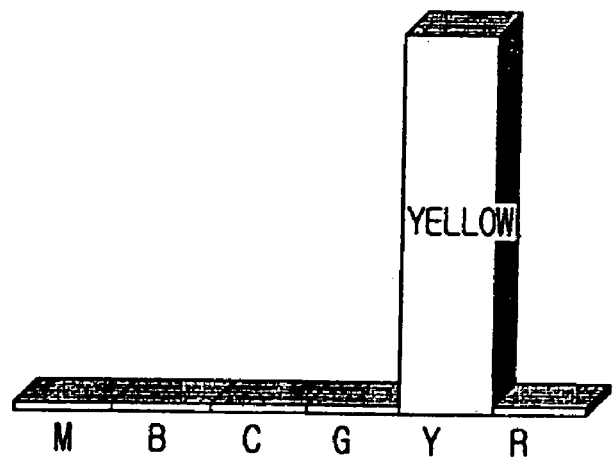

Even though the "A" part of FIG. 8A and FIG. 8C all have orange, FIG. 8A has an orange color that is close to a red color, and FIG. 8C has an orange color that is close to a yellow color. Though these two colors are all counted as an orange color, the orange color of FIG. 8A is counted to the red histogram bin shown in FIG. 8B, yet the FIG. 8C orange color is counted to the yellow histogram bin shown in FIG. 8D. Like this, information exists between bins having similar features but they are assigned to different bins and therefore they are described as different feature information in conventional methods, which may cause significant problems.

To solve such problems, linear weights are applied in accordance with the distance between bins in an embodiment of the present invention and therefore a quantization error caused between bins is minimized.

FIG. 9 shows a method for updating histograms with linear weights in accordance with an embodiment of the present invention.

Figure 9A:
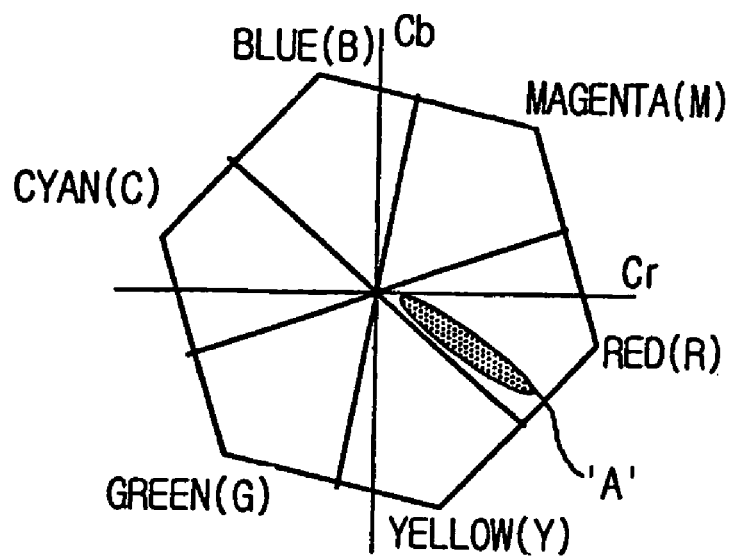
FIGS. 9A–9D show a method for updating histogram with linear weights in accordance with an embodiment of the present invention.
Figure 9B:
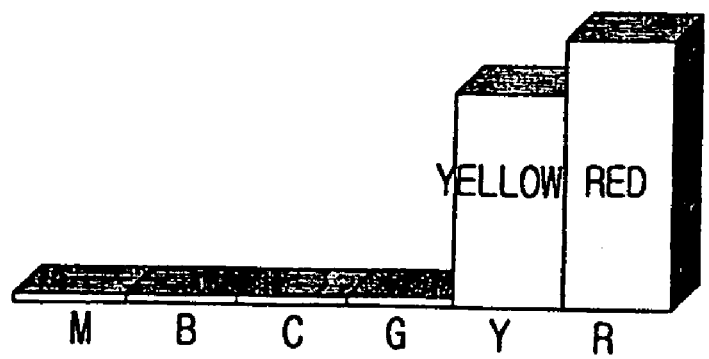
Figure 9C:
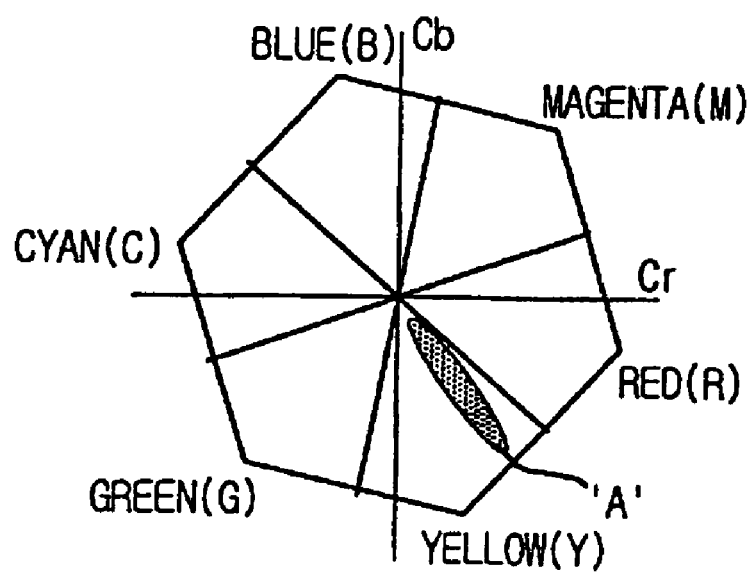
Figure 9D:
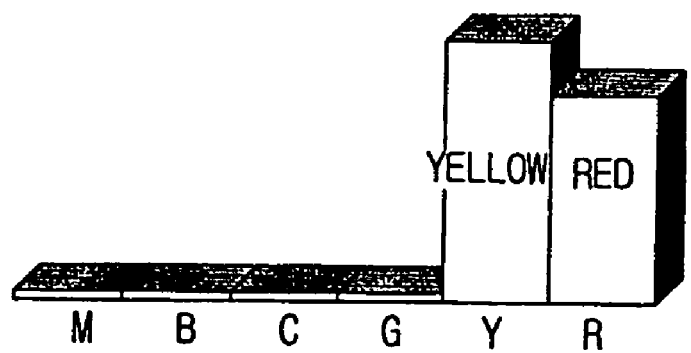

As shown in FIGS. 9A–9D, the "A" part of FIG. 9A and FIG. 9C all have an orange color and their positions are in a boundary between red and yellow. More weights are assigned to the red color for an orange color that is close to the red color and the histogram is counted accordingly as shown in FIG. 9B. More weights are assigned to a yellow color for the orange color that is close to a yellow color and the histogram is counted accordingly as shown in FIG. 9D. Linear weights are applied in proportion to the distance between bins and therefore quantization errors caused in between bins are minimized. Therefore, it is advantageous that even histograms with a small number of bins are able to reflect feature information precisely.

An embodiment of the linear update functions as follows.

FIG. 10 shows an embodiment in which magenta, blue, cyan, green, and yellow are prepared as representative hues. Unsaturated color is separated into five levels on the basis of brightness and histogram bins are counted. In this case, histogram bins h(0) through h(5) mean color histograms and histogram bins h(6) through h(10) mean brightness histograms.

In embodiments of the present invention, pseudo hue and pseudo saturation are calculated and used in a YcbCr color space. However, if a color space requires hue and saturation, for example, HSV color space is employed, hue and saturation are used instead of pseudo hue and pseudo saturation.

In the YcbCr color space, pseudo hue and pseudo saturation are defined as follows.

$$\text{Pseudo Hue: } ph = \tan^{-1}\frac{Cb}{Cr} \quad \text{[Equation 2]}$$

$$\text{Pseudo Saturation } ps = \sqrt{Cr^2 + Cb^2}$$

The linear weight ($\alpha$) between representative hues of saturated color region and the linear weight ($\beta$) between saturated color and unsaturated color are defined as follows.

$$\alpha = \frac{ph(p,q) - ph_i}{ph_{i+1} - ph_i} = \frac{\theta}{60}, \beta = \frac{ps(p,q)}{T_s} \quad \text{[Equation 3]}$$

$ph_i$: ith representative hue $ph(p,q)$: hue at color space (p,q), that is, angle at color space $ps(p,q)$: saturation at color space (p,q), that is, distance from the origin of color space Color information with hue information is only used as color feature information that is not related to the brightness of the image. Around the origin of color space, Cr and Cb have values about zero, which means unsaturated color. Generally, this hue value and the distance from the origin of color space are used as a threshold to separate saturated color and unsaturated color. When natural images are employed, many cases are around the threshold and therefore serious errors are caused. That is, relatively bright colors are updated at saturated color histogram bins and relatively dark colors are updated at unsaturated color histogram bins. Likewise, two colors of similar brightness are updated at different color bins.

In an embodiment of the present invention, an update method with linear weights is employed for the boundary between unsaturated color and saturated color.

Figure 10A:
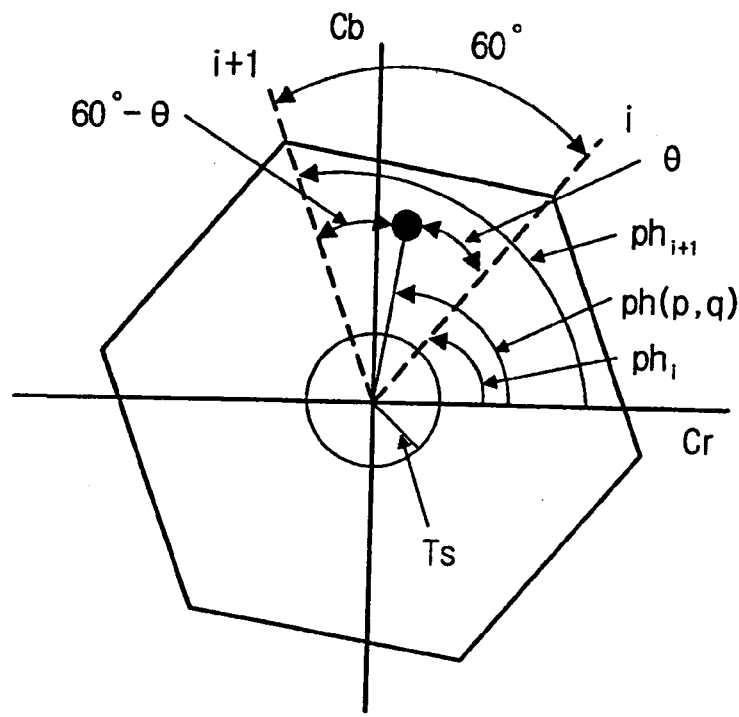
FIGS. 10A–10B show a method with linear weights between bins of saturated color and linear weights between saturated color and unsaturated color.

Let's suppose that a starting threshold of unsaturated color is Ts. Then, a color whose saturation is larger than Ts is a pure color. As shown in FIG. 10A, each bin values (h(i)) of color histograms is increased by applying only a linear weight ($\alpha$). The amount of increase is obtained by the following equation.

$$h(i)=h(i)+(1.0-\alpha), h(i+1)=h(i+1)+\alpha \quad \text{[Equation 4]}$$

where i=0,1,2,3,4,5

Figure 10B:
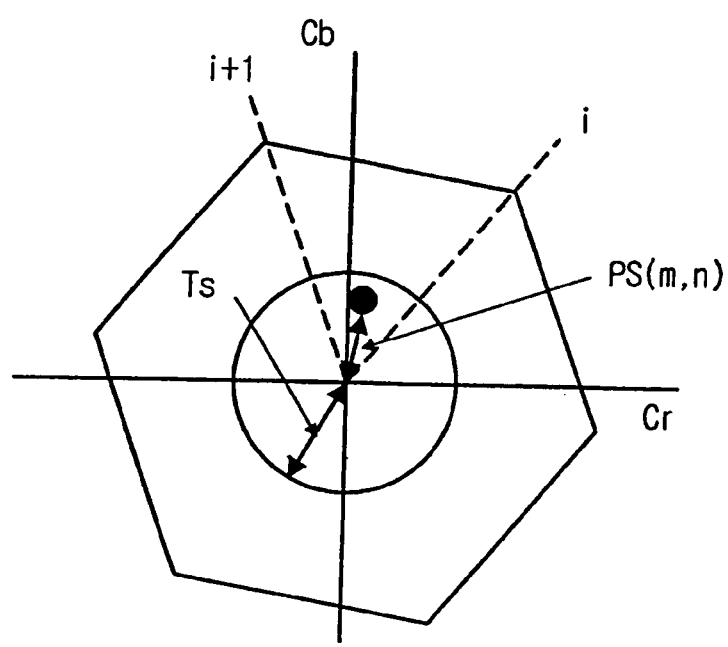

If saturation (ps) is not larger than Ts and the color is close to the origin in color space, linear weight $\alpha$ and linear weight $\beta$ are used to increase bins of color histograms as shown in FIG. 10B. The amount of increase is obtained by following equation.

$$h(i)=h(i)+(1.0-\alpha),\times\beta h(i+1)=h(i+1)+\alpha\times\beta \quad \text{[Equation 5]}$$

where i=0,1,2,3,4,5

In addition, in the case of colors whose brightness is dark, a brightness histogram has five bins and the brightness histogram bins are increased by following equation with linear weight $\beta$.

IF(0≤luminance value of unsaturated color region<52) THEN $h(6)=h(6)+(1-\beta)$

ELSEIF(52≤luminance value of unsaturated color region<103) THEN $h(7)=h(7)+(1-\beta)$ ELSEIF(103≤luminance value of unsaturated color region<154) THEN $h(8)=h(8)+(1-\beta)$ ELSEIF(154≤luminance value of unsaturated color region<204) THEN $h(9)=h(9)+(1-\beta)$ ELSEIF(204≤luminance value of unsaturated color region<256) THEN $h(10)=h(10)+(1-\beta)$ [Equation 6]

Figure 11A:
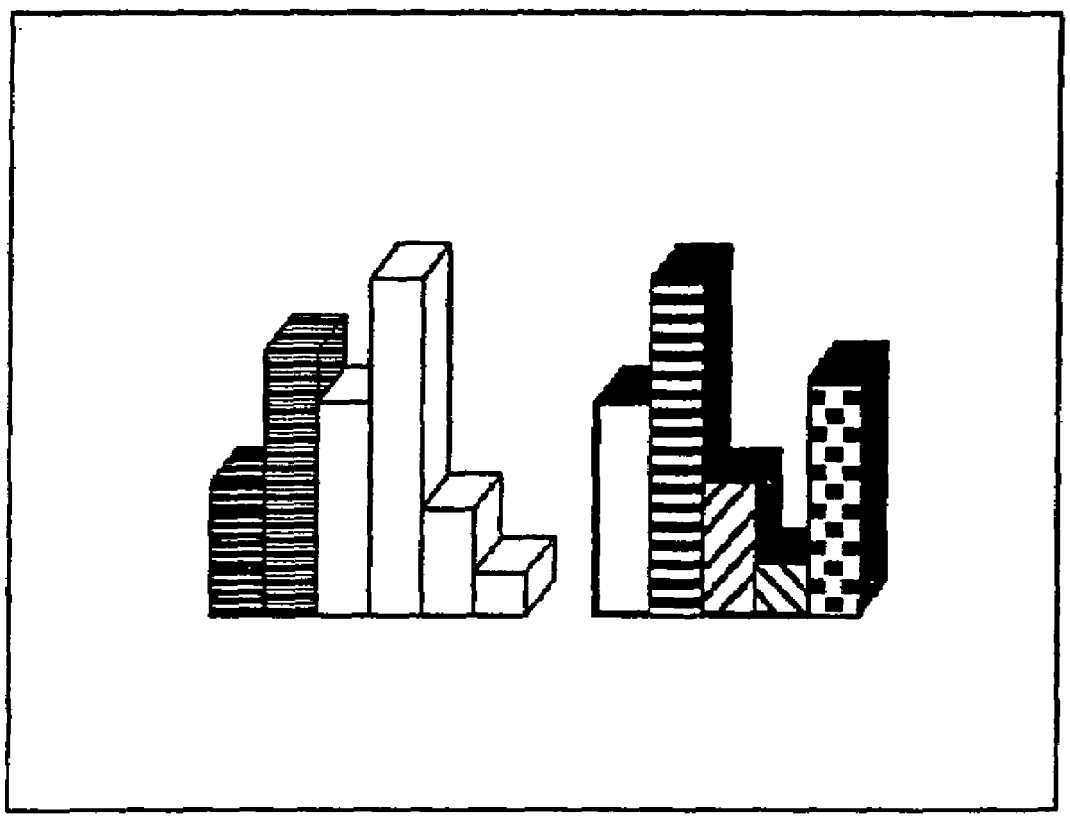
FIGS. 11A–11C show a composite histogram of a global region histogram, a semi-global region histogram, and a local region histogram.
Figure 11B:
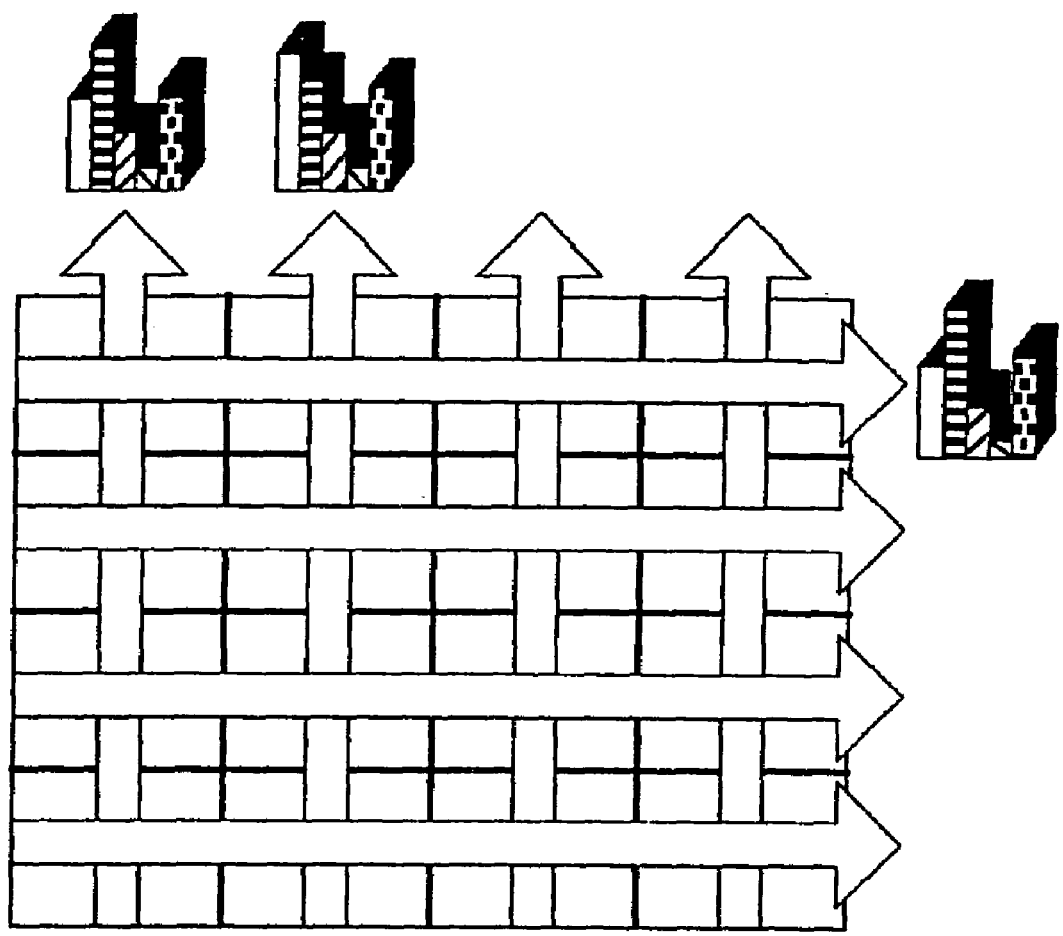
Figure 11C:
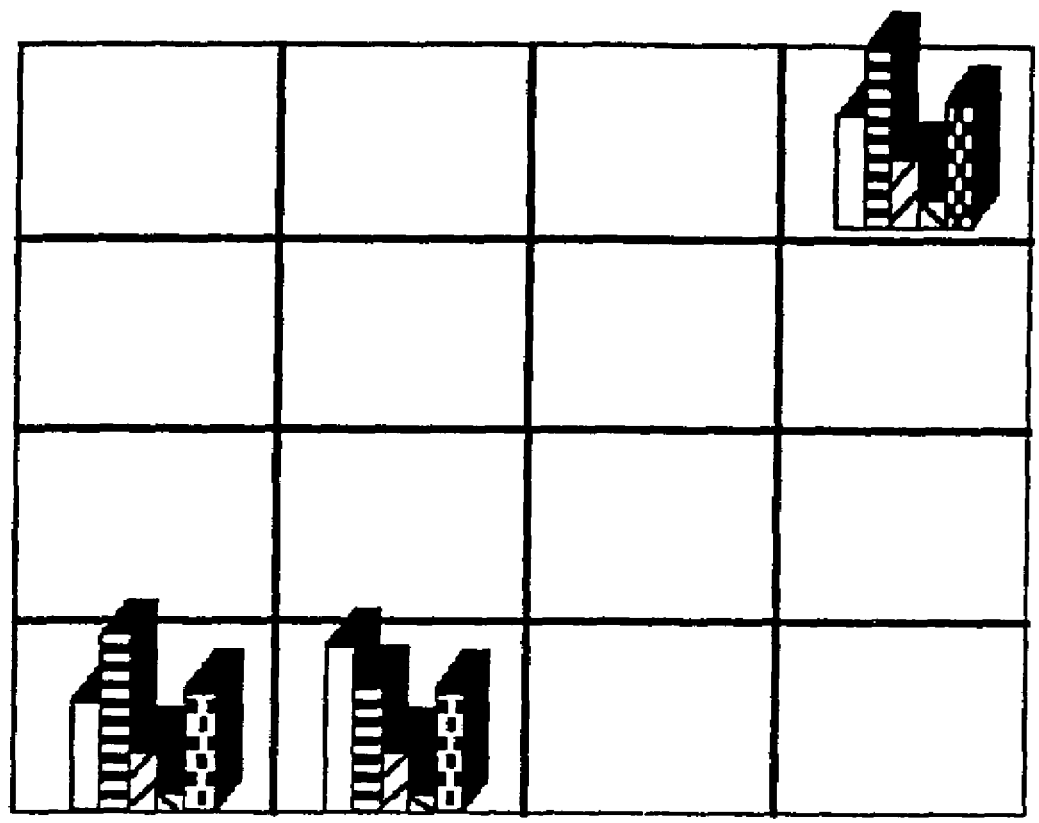

As shown in FIGS. 11A–11C, histograms for a global region, a semi-global region, and a local region are generated with the help of block-based histograms. The generated histograms may be used as feature information that effectively reflect global features and local position information of an image.

Figure 12:
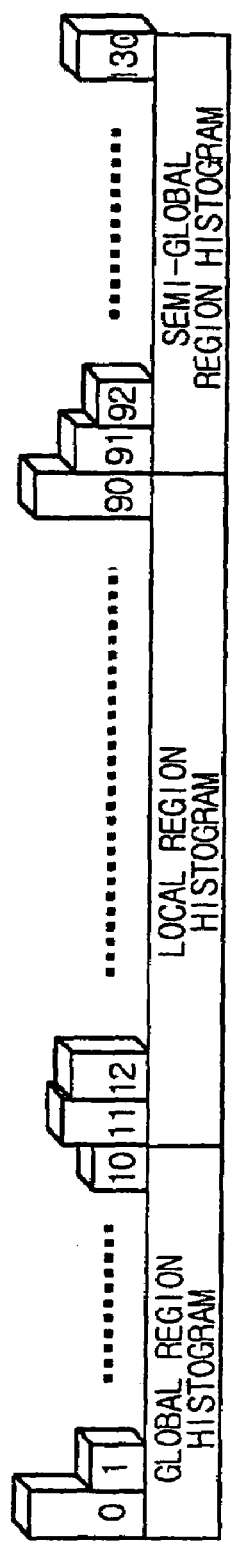
FIG. 12 is a diagram illustrating an embodiment of the composite histogram shown in FIG. 11.

As shown in FIG. 12, six brightness bins and five edge bins may be used to generate eleven histogram bins regarding global region. Global feature information of the image is described by the eleven histogram bins.

A global region is divided into 16 local regions and five edge bins are generated at each local region. Consequently, as shown in FIG. 12, eighty histogram bins are generated.

Finally, four semi-global regions of a horizontal direction and four semi-global regions of a vertical direction are created by accumulating related block edges. Each semi-global region has five edge bins and a total of forty edge bins are created as shown in FIG. 12.

In case of composite histograms, brightness information for a global region is updated at h(0) through h(5) and edge information regarding a global region is updated at h(6) through h(10). Edge information regarding a local region is updated at h(11) through h(90) and edge information regarding a semi-global region is updated at h(91) through h(130).

Once the sequence of histogram bins is determined, histograms of semi-global regions and histograms of local regions describe position information and edge feature information at the same time.

At the moment, the composite histograms are normalized at each region in the following way.

First, global region histogram bins (global_histogram_value(i)) are divided by the total number of blocks (global_number_block) that exist in the global region. Equation 7 shows the normalization process.

$$\text{normalize\_histogram}[i] = \frac{\text{global\_histogram\_value}[i]}{\text{global\_number\_block}}, \quad \text{[Equation 7]}$$

$$i = 0 \ldots 10$$

Second, regarding an image of each local region, eighty histogram bins of a local region are divided by the total number of blocks (local_global_number_block) in the local region. Equation 8 shows the normalization process.

$$\text{normalize\_histogram}[i] = \frac{\text{local\_histogram\_value}[i]}{\text{local\_number\_block}}, \quad \text{[Equation 8]}$$

$$i = 11 \ldots 90$$

Finally, regarding an image of each local region, forty bins of a semi-global region are divided by the total number of blocks (semi_global_number_block) in the semi-global region. Equation 9 shows the normalization process.

$$\text{normalize\_histogram}[i] = \frac{\text{semi\_global\_histogram\_value}[i]}{\text{semi\_global\_number\_block}}, \quad \text{[Equation 9]}$$

$$i = 91 \ldots 130$$

FIG. 12 shows normalize_histogram[i].

Since the method for generating a block-based image histogram in accordance with the present invention extracts feature information by blocks that include a number of pixels, it is possible to obtain edge information that was not obtained by conventional methods. Also, the method extracts feature information such as brightness of various resolutions, color, and edge. Therefore, feature information that reflects image content is finely acquired and accurate comparison is possible for similarity measurement and distance measurement.

In addition, since the method employs a linear update method, quantization errors caused at boundaries between bins may be significantly decreased. Since the method normalizes histogram bins, similar image can be searched regardless of the size of images.

Although representative embodiments of the present invention have been disclosed for illustrative purpose, those who are skilled in the art will appreciate that various modifications, additions and substitutions are possible without departing from the scope and spirit of the present invention as defined in the accompanying claims and in equivalents thereof.

We claim:

1. A method for generating a block-based image histogram using color information and brightness information of image data, comprising:

grouping a plurality of pixels of the image into a block;

dividing the block into four sub-blocks by dividing the block by half with respect to a horizontal direction and dividing the block by half with respect to a vertical direction and then obtaining brightness representative values of the sub-blocks and determining if an edge exists in the block and an edge type by comparing a brightness difference between the adjacent sub-blocks with a threshold;

increasing related edge histogram bins on the basis of the edge type and thereby updating the edge histograms;

obtaining a hue and a saturation from a color space of the image and obtaining a linear weight between representative colors of saturated colors and a linear weight between saturated color and unsaturated color using the hue and the saturation; and calculating an increase of color histogram bins with the linear weight and updating related color histograms when the color of the block is a pure color or calculating an increase of color histogram bins and brightness histogram bins with the linear weights and updating related color histograms and related brightness histograms when the color of the block is a dark unsaturated color.

2. The method for generating a block-based image histogram of claim 1, comprising describing at least two feature information by one composite histogram in a group of the feature information, where the two feature information comprises the color information and the brightness information of the image.

* * * * *